(12) United States Patent
Buelow et al.

(10) Patent No.: US 12,303,822 B2
(45) Date of Patent: May 20, 2025

(54) FILTER UNIT FOR ADSORBING WATER AND GAS AND SYSTEMS AND METHODS OF USE THEREOF

(71) Applicant: BASF Corporation, Florham Park, NJ (US)

(72) Inventors: Mark Thomas Buelow, Iselin, NJ (US); Yuxuan Xin, Plainsboro, NJ (US); Pascaline Tran, Iselin, NJ (US); Akash Abraham, Brooklyn, NY (US)

(73) Assignee: BASF Corporation, Florham Park, NJ (US)

( * ) Notice: Subject to any disclaimer, the term of this patent is extended or adjusted under 35 U.S.C. 154(b) by 679 days.

(21) Appl. No.: 17/440,730

(22) PCT Filed: Mar. 19, 2020

(86) PCT No.: PCT/US2020/023637
§ 371 (c)(1),
(2) Date: Sep. 17, 2021

(87) PCT Pub. No.: WO2020/191197
PCT Pub. Date: Sep. 24, 2020

(65) Prior Publication Data
US 2022/0219110 A1    Jul. 14, 2022

Related U.S. Application Data (60) Provisional application No. 62/820,725, filed on Mar. 19, 2019.

(51) Int. Cl.
*B01D 53/06* (2006.01)
*B01D 53/04* (2006.01)
(Continued)

(52) U.S. Cl.
CPC ......... *B01D 53/06* (2013.01); *B01D 53/0438* (2013.01); *B01D 53/261* (2013.01);
(Continued)

(58) Field of Classification Search
CPC .. B01D 53/06; B01D 53/0438; B01D 53/261; B01D 2253/20; B01D 2253/304;
(Continued)

(56) References Cited

U.S. PATENT DOCUMENTS 3,513,631 A    5/1970   Seibert et al.
5,158,582 A *  10/1992  Onitsuka ............ B01D 53/9481
                                                     95/122
(Continued)

FOREIGN PATENT DOCUMENTS

EP    3431890 A1    1/2019
JP    H03161009 A   7/1991
(Continued)

OTHER PUBLICATIONS

International Search Report and Written Opinion for PCT/US2020/023637 mailed Jul. 27, 2020, 17 pgs.
(Continued)

*Primary Examiner* — Dung H Bui
(74) *Attorney, Agent, or Firm* — Lowenstein Sandler LLP (57) ABSTRACT

Disclosed are embodiments of a filter unit containing a water adsorbent material in the form of water adsorbent particles in a packed bed and a gas adsorbent material in the form of gas adsorbent particles in a packed bed. In embodiments, the gas adsorbent material is downstream from the water adsorbent material in a direction of operation. Further disclosed are methods of preparing and using the filter units.

18 Claims, 2 Drawing Sheets

(51) Int. Cl.
  *B01D 53/26* (2006.01)
  *B01J 20/10* (2006.01)
  *B01J 20/16* (2006.01)
  *B01J 20/22* (2006.01)
  *B01J 20/26* (2006.01)
  *B01J 20/28* (2006.01)
  *B60H 3/06* (2006.01)
  *F24F 8/10* (2021.01)

(52) U.S. Cl.
  CPC .......... *B01J 20/103* (2013.01); *B01J 20/16* (2013.01); *B01J 20/22* (2013.01); *B01J 20/26* (2013.01); *B01J 20/28016* (2013.01); *B01J 20/28019* (2013.01); *B01J 20/28073* (2013.01); *B01J 20/28076* (2013.01); *B01J 20/28083* (2013.01); *B01J 20/28085* (2013.01); *B60H 3/0608* (2013.01); *F24F 8/10* (2021.01); *B01D 2253/20* (2013.01); *B01D 2253/304* (2013.01); *B01D 2253/311* (2013.01); *B01D 2257/504* (2013.01); *B01D 2257/80* (2013.01); *B01D 2259/4009* (2013.01); *B01D 2259/414* (2013.01); *B01D 2259/4566* (2013.01); *B01J 2220/42* (2013.01); *B01J 2220/46* (2013.01); *B01J 2220/56* (2013.01)

(58) Field of Classification Search
  CPC ........ B01D 2253/311; B01D 2257/504; B01D 2257/80; B01D 2259/4009; B01D 2259/414; B01D 2259/4566; B01D 2258/06; B01D 53/0407; B01D 53/0446; B01J 20/103; B01J 20/16; B01J 20/22; B01J 20/26; B01J 20/28016; B01J 20/28019; B01J 20/28073; B01J 20/28076; B01J 20/28083; B01J 20/28085; B01J 2220/42; B01J 2220/46; B01J 2220/56; B01J 20/18; B01J 20/226; B01J 20/2803; B01J 20/2804; B01J 20/3483; B01J 20/041; B01J 20/20; B01J 20/28069; B01J 20/28078; B01J 20/3234; B01J 20/3293; B60H 3/0608; B60H 2003/028; B60H 2003/0691; B60H 3/024; B60H 3/0633; F24F 8/10
  See application file for complete search history.

(56) References Cited

U.S. PATENT DOCUMENTS

| | | | |
|---|---|---|---|
| 5,667,560 A * | 9/1997 | Dunne | B60H 3/024 95/143 |
| 6,099,609 A * | 8/2000 | Lira | F04D 29/281 55/467 |
| 6,358,374 B1 * | 3/2002 | Obee | B01D 53/0415 204/157.3 |
| 7,326,277 B1 * | 2/2008 | Cohen | B60T 17/004 96/125 |
| 9,216,405 B1 * | 12/2015 | Tan | B01D 53/02 |
| 9,266,057 B1 * | 2/2016 | Jones | B01D 53/1425 |
| 9,375,672 B2 | 6/2016 | Meirav et al. | |
| 10,507,424 B1 * | 12/2019 | Müller-Hellwig | B01D 53/0462 |
| 2001/0029843 A1 | 10/2001 | Minoru et al. | |
| 2005/0199124 A1 | 9/2005 | Little et al. | |
| 2005/0235827 A1 | 10/2005 | Dinnage et al. | |
| 2005/0272602 A1 | 12/2005 | Ninomiya | |
| 2005/0287050 A1 | 12/2005 | Rabellino et al. | |
| 2007/0089605 A1 * | 4/2007 | Lampinen | F24F 8/90 95/139 |
| 2013/0030340 A1 | 1/2013 | Vincent et al. | |
| 2014/0190658 A1 * | 7/2014 | Park | B60H 3/024 165/8 |
| 2015/0291870 A1 * | 10/2015 | Van Horn | C07F 15/065 556/113 |
| 2016/0025360 A1 * | 1/2016 | West | F24F 8/95 95/170 |
| 2017/0239609 A1 | 8/2017 | Luisman et al. | |
| 2018/0029448 A1 * | 2/2018 | Ito | F24F 3/1411 |
| 2018/0099542 A1 * | 4/2018 | Sakakibara | B60K 37/00 |
| 2018/0312043 A1 * | 11/2018 | Komatsubara | B60H 3/022 |
| 2018/0328580 A1 * | 11/2018 | Tezuka | F21S 45/10 |
| 2018/0369750 A1 * | 12/2018 | Riley | B01D 53/346 |
| 2019/0039047 A1 | 2/2019 | Kimura et al. | |
| 2019/0111768 A1 * | 4/2019 | Komatsubara | B60H 3/02 |
| 2019/0160417 A1 * | 5/2019 | Matsumoto | B01D 53/0462 |
| 2020/0009533 A1 * | 1/2020 | Space | B64D 13/06 |
| 2020/0206682 A1 * | 7/2020 | Desai | B01D 53/268 |

FOREIGN PATENT DOCUMENTS

| | | |
|---|---|---|
| JP | H09141040 A | 6/1997 |
| JP | 2885889 B2 | 4/1999 |
| JP | 2009106849 A | 5/2009 |
| JP | 2013154302 A | 8/2013 |
| WO | 1999/034896 A1 | 7/1999 |
| WO | 200166258 A1 | 9/2001 |
| WO | 2018034570 A1 | 2/2018 |

OTHER PUBLICATIONS

Extended European Search Report Serial No. EP 20773020.1, dated May 10, 2023, 12 pages.

* cited by examiner

FILTER UNIT FOR ADSORBING WATER AND GAS AND SYSTEMS AND METHODS OF USE THEREOF

CROSS-REFERENCE TO RELATED APPLICATIONS

This application is a national stage entry under 35 U.S.C. § 371 of International Application No. PCT/US2020/023637, filed on Mar. 19, 2020, which claims the benefit of priority of U.S. Provisional Patent Application No. 62/820,725, filed on Mar. 19, 2019, the disclosures of which are hereby incorporated by reference herein in their entireties.

FIELD

This disclosure relates to a filter unit having a water adsorbent material and a gas adsorbent material, for example, to remove water and gas from a passenger cabin. The disclosure also relates to systems incorporating such filter units and methods of use thereof.

BACKGROUND

Maintaining air quality within enclosed spaces, such as in passenger cabins in vehicles, is an important, yet high-energy consumption process. Passengers consume oxygen and produce carbon dioxide ($CO_2$) and humidity in significant amounts. Carbon dioxide and humidity levels increase quickly unless the inside air is replaced with large amounts of fresh, outside air, introduced into the cabin.

Replacing cabin air with outside air has challenges with respect to the cooling and heating power required by heating, ventilation, and air-conditioning (HVAC) systems to condition the fresh outside air, and the quality of the outside air (e.g., air on highways containing elevated levels of contaminants). Conditioning is a significant energy consumption source (up to 50%), which is particularly draining for batteries of electric vehicles.

Carbon dioxide sorbent materials have been developed to reduce $CO_2$ concentrations to safe levels and to improve the energy efficiency of HVAC systems. Specifically, HVAC systems have utilized $CO_2$ scrubbers that incorporate $CO_2$ sorbents to adsorb $CO_2$ from recirculated interior air and then release the $CO_2$ into outside air by a purging process. While such systems have improved upon conventional HVAC systems in terms of energy savings, the sorbent materials fail to meet long term targets for working capacity and thermal aging stability.

Additionally, desiccant systems have been developed to reduce humidity in passenger cabins thereby reducing condensation on the windows. However, desiccants absorb only a limited amount of moisture. At low temperatures and high humidity, a typical ventilation system in an automobile may be incapable of efficiently, effectively and/or rapidly removing the condensation.

BRIEF SUMMARY

According to embodiments, disclosed herein is a filter unit, comprising: two adsorption lines, each adsorption line comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation; and a heater coupled to each packed bed in each adsorption line.

According to embodiments, disclosed herein is a filter unit, comprising: a rotary adsorption apparatus comprising: a housing; a plurality of sectors within the housing, wherein the plurality of sectors form a plurality of adsorption beds; and a water adsorbent material in at least one of the adsorption beds, for example, wherein the water adsorbent material is in the form of water adsorbent particles in a packed bed; and a gas adsorbent material in at least one of the adsorption beds, for example, wherein the gas adsorbent material is in the form of gas adsorbent particles in a packed bed, wherein the water adsorbent material and the gas adsorbent material are arranged in the rotary adsorption apparatus so that a flow path of gas can pass over each adsorption bed during operation and a counter-current flow path of regeneration air can pass over each adsorption bed during regeneration.

According to embodiments, disclosed herein is a system, comprising: a passenger cabin; a heating, ventilation and air conditioning (HVAC) system for maintaining air quality in the passenger cabin; and a filter unit for maintaining humidity and carbon dioxide levels within the passenger cabin, the filter unit comprising: two adsorption lines, each adsorption line comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation; and a heater coupled to each packed bed in each adsorption line.

According to embodiments, disclosed is an electric automobile ventilation system comprising: a passenger cabin; a heating, ventilation and air conditioning (HVAC) system for maintaining air quality in the passenger cabin; a battery; and a filter unit for maintaining humidity and carbon dioxide levels within the passenger cabin, the filter unit comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation.

According to embodiments, disclosed herein is an automobile ventilation system comprising: a passenger cabin; a heating, ventilation and air conditioning (HVAC) system for maintaining air quality in the passenger cabin; and a filter unit for maintaining humidity and carbon dioxide levels within the passenger cabin, the filter unit comprising: two adsorption lines, each adsorption line comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation; and a heater coupled to each packed bed in each adsorption line.

According to embodiments, disclosed herein is a method of using a filter unit, comprising: operating a first adsorption line of the filter unit, the first adsorption line comprising: a first water adsorbent material, for example, in the form of water adsorbent particles in a packed bed; and a first gas adsorbent material, for example, in the form of gas adsorbent particles in a packed bed, wherein the first gas adsorbent material is downstream from the first water adsorbent material in a direction of operation, wherein the first adsorption line adsorbs water and gas from surrounding air; and regenerating a second adsorption line of the filter unit, the second adsorption line comprising: a second water adsorbent material, for example, in the form of water adsorbent particles in a packed bed; and a second gas adsorbent material, for example, in the form of gas adsorbent particles in a packed bed, wherein the second gas adsorbent material is upstream from the second water adsorbent material in a direction of regeneration, wherein the second adsorption line desorbs water and gas from the second water adsorbent material and the second gas adsorbent material.

According to embodiments, disclosed herein is a filter unit, comprising: a water adsorbent material, wherein the water adsorbent material is present in an amount of about 0.1 L to about 15.0 L per passenger, or at least about 0.1 L per passenger; and a gas adsorbent material, wherein the gas adsorbent material is present in an amount of about 0.5 L to about 20.0 L per passenger, or at least about 0.5 L per passenger, wherein the gas adsorbent material is downstream from the water adsorbent material in a direction of operation.

According to embodiments, disclosed herein is a filter unit, comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation, and wherein a weight ratio of the water adsorbent material to the gas adsorbing material is about 1:10 to about 1:1, or about 1:4 to about 1:1, or about 1:4.

According to embodiments, disclosed herein is a filter unit, comprising: two adsorption lines, each adsorption line comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation.

According to embodiments, disclosed herein is a filter unit, comprising: two adsorption lines, each adsorption line comprising: a water adsorbent material, for example, in the form of water adsorbent particles in a packed bed, wherein the water adsorbent material is present in an amount of about 0.1 L to about 7.5 L per passenger, or at least about 0.1 L per passenger; and a gas adsorbent material, for example, in the form of gas adsorbent particles in a packed bed, wherein the gas adsorbent material is present in an amount of about 0.5 L to about 10.0 L per passenger, or at least about 0.5 L per passenger, wherein the gas adsorbent material is downstream from the water adsorbent material in a direction of operation.

According to embodiments, disclosed herein is a filter unit, comprising: two adsorption lines, each adsorption line comprising: a water adsorbent material, for example, in the form of water adsorbent particles in a packed bed; and a gas adsorbent material, for example, in the form of gas adsorbent particles in a packed bed, wherein the gas adsorbent material is downstream from the water adsorbent material in a direction of operation, and wherein a weight ratio of the water adsorbent material to the gas adsorbing material is about 1:10 to about 1:1, or about 1:4 to about 1:1, or about 1:4.

According to embodiments, disclosed herein is a filter unit, comprising: a water adsorbent material, for example, in the form of water adsorbent particles in a packed bed, wherein the water adsorbent particles comprise at least one of silica, alumina or a metal organic framework; and a gas adsorbent material, for example, in the form of gas adsorbent particles in a packed bed, wherein the gas adsorbent particles comprise at least one of an amine, a carbamate, attapulgite, a metal organic framework (MOF), a zeolite, activated carbon, an alkali metal oxide, an alkaline earth metal oxide, a surface modified analog of any of the foregoing and combinations thereof, and wherein the gas adsorbent material is downstream from the water adsorbent material in a direction of operation.

According to embodiments, disclosed herein is a filter unit, comprising: a water adsorbent material, for example, in the form of water adsorbent particles in a packed bed; and a gas adsorbent material, for example, in the form of gas adsorbent particles in a bed, wherein the gas adsorbent particles comprise at least one of amines or carbamates impregnated onto one or more high surface area supports, wherein the gas adsorbent material is downstream from the water adsorbent material in a direction of operation. The amines can include an amine functionalized polymer, for example, a polystyrene polymer, wherein the polystyrene polymer comprises, for example, benzylamine groups. In embodiments, the amine is in the form of a bead and/or other unit as described herein. The carbamates can be one or more products of the reaction between an ethylamine and dimethyl carbonate.

According to embodiments, disclosed herein is a filter unit, comprising: a water adsorbent material, for example, in the form of water adsorbent particles in a packed bed; and a gas adsorbent material, for example, in the form of gas adsorbent particles in a packed bed, wherein the gas adsorbent particles are contained within channels of a honeycomb structure or are coated onto a substrate (e.g., including honeycomb structures), wherein the gas adsorbent material is downstream from the water adsorbent material in a direction of operation.

According to embodiments, disclosed herein is a filter unit, comprising: a water adsorbent material, for example, in the form of water adsorbent particles in a packed bed; and a gas adsorbent material, for example, in the form of gas adsorbent particles in a packed bed, wherein the gas adsorbent particles comprise about 35 wt % to about 55 wt % amine (e.g., particles) and about 45 wt % to about 65 wt % silica (e.g., particles), wherein the gas adsorbent material is downstream from the water adsorbent material in a direction of operation.

DETAILED DESCRIPTION

Described herein are various embodiments of a filter unit having a water adsorbent material (also referred to herein as a "water sorbent") and a gas adsorbent material (also referred to herein as a "gas sorbent") to remove water (e.g., humidity) and gas from a passenger cabin, and systems and methods of use thereof. It is to be understood that the invention is not limited to the details of construction or process steps set forth in the following description. The invention is capable of other embodiments and of being practiced or being carried out in a variety of ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a catalyst material" includes a single catalyst material as well as a mixture of two or more different catalyst materials.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition free of any volatiles, that is, based on dry solids content.

Although the disclosure herein is with reference to particular embodiments, it is to be understood that these embodiments are merely illustrative of the principles and applications of the invention. It will be apparent to those skilled in the art that various modifications and variations can be made to the compositions and methods without departing from the spirit and scope of the invention. Thus, it is intended that the invention include modifications and variations that are within the scope of the appended claims and their equivalents.

Filter Units and Systems

The filter units described herein are useful, among other things, to remove water and gas (e.g., $CO_2$) from the air within an enclosed space. The enclosed space may be a passenger cabin including, but not limited to, the passenger cabin of a vehicle, airplane, helicopter or spacecraft. The term vehicle encompasses, for example, any moving means of transportation having a closed cabin. In embodiments, the vehicle is an automobile, a van, a bus, a train, a truck or a submarine. Vehicles (e.g., automobiles) typically employ HVAC systems to condition and recirculate the air within the cabin.

In a passenger cabin with four occupants and no outside air circulation, the $CO_2$ concentration within the closed space can increase at a rate of at least 300 parts per million (ppm) per minute. After about 10 minutes, the $CO_2$ concentration of the cabin air can be higher than 2,500 ppm. After thirty minutes, the $CO_2$ concentration can reach about 4,000 ppm, which is dangerously above the recommended $CO_2$ concentration limit of 1,000 ppm indoors. Even moderately elevated $CO_2$ levels can have a substantial impact on human cognitive functions.

Figure 1:
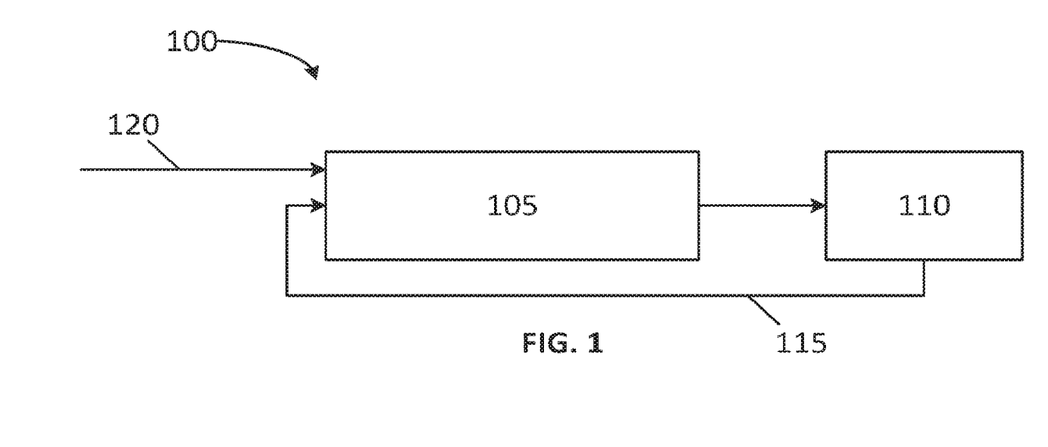
FIG. 1 illustrates a standard system for conditioning air in a cabin using an HVAC system.

A typical vehicle circulation system 100 is shown in FIG. 1. An HVAC system 105 heats, ventilates and cools the air in the cabin 110. The cabin air is recirculated via a recirculation line 115 and fresh, outside air is introduced into the HVAC system through an air inlet line 120. A pump (not shown) is typically used to draw in the fresh air and transfer it to the HVAC system for conditioning.

According to embodiments, disclosed herein is a filter unit for removing water and gas from air. The filter unit can contain a water adsorbent material. The water adsorbent material can be present in an amount of about 0.05 L to about 30 L, or about 0.1 L to about 20 L, or about 0.5 L to about 15.0 L per passenger, or at least about 0.1 L, or at least about 0.4 L, or at least about 0.6 L, or at least about 0.8 L, or at least about 1.0 L per passenger. The filter unit further includes a gas adsorbent material. The gas adsorbent material can be present in an amount of about 0.1 L to about 35 L, or about 0.5 L to about 30 L, or about 1.0 L to about 25 L, or about 2.0 L to about 20.0 L per passenger, or at least about 0.5 L, or at least about 1.0 L, or at least about 2.0 L, or at least about 2.4 L, or at least about 3.0 L, or at least about 4.0 L, or at least about 5.0 L per passenger. According to embodiments, the gas adsorbent material can be positioned downstream from the water adsorbent material in a direction of operation. A weight ratio of the water adsorbent material to the gas adsorbing material can be about 1:10 to about 1:1, or about 1:4 to about 1:1, or about 1:2, or about 1:3, or about 1:4, or about 1:5, or about 1:6.

Figure 3:
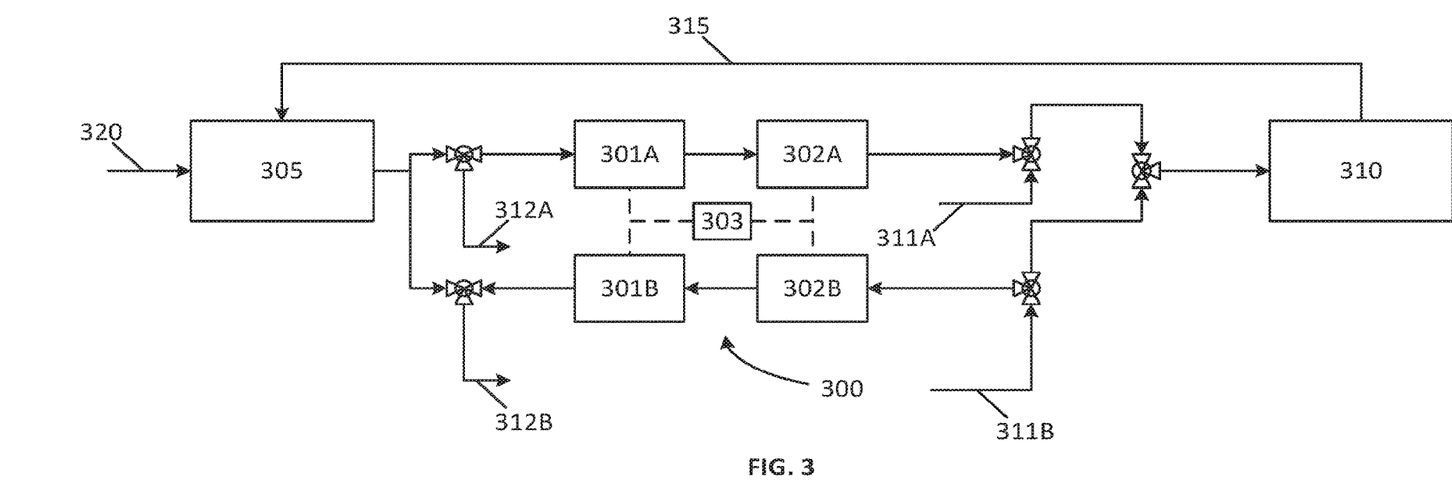
FIG. 3 illustrates a filter unit and system according to embodiments described herein.

According to embodiments, a filter unit as described herein can contain two adsorption lines, each adsorption line having a water adsorbent material and a gas adsorbent material as described in more detail with respect to FIG. 3. It should be noted that while a single filter unit can have two adsorption lines, a pair of adsorption filter units each containing a single adsorption line is equivalent and can function the same. In each adsorption line, the gas adsorbent material can be positioned downstream from the water adsorbent material in a direction of operation.

According to embodiments, the water adsorbent material can be present in an amount of about 0.05 L to about 15.0 L, or about 0.1 L to about 10.0 L, or about 0.25 L to about 7.5 L per passenger, or at least about 0.1 L, or at least about 0.2 L, or at least about 0.3 L, or at least about 0.4 L, or at least about 0.5 L, or at least about 0.6 L per passenger. The gas adsorbing material can be present in an amount of about 0.1 L to about 20 L, or about 0.5 L to about 15 L, or about 1.0 L to about 10 L per passenger, or at least about 0.8 L, or at least about 0.9 L, or at least about 1.0 L, or at least about 1.1 L, or at least about 1.2 L, or at least about 1.3 L, or at least about 1.4 L, or at least about 1.5 L per passenger. A weight ratio of the water adsorbent material to the gas adsorbing material can be about 1:10 to about 1:1, or about 1:4 to about 1:1, or about 1:4, or about 1:2, or about 1:3, or about 1:4, or about 1:5, or about 1:6.

In embodiments, as will be discussed in more detail below, the water adsorbing material, for example, in the form of a plurality of units, can include at least one of silica, alumina or a metal organic framework and the gas adsorbent material can include at least one of an amine, a carbamate, attapulgite, a metal organic framework (MOF), a zeolite, activated carbon, an alkali metal oxide, an alkaline earth metal oxide, a surface modified analog of any of the foregoing and combinations thereof. As will be discussed in more detail below, according to embodiments, the gas adsorbent material can include at least one of amines or carbamates impregnated onto one or more high surface area supports.

Figure 2:
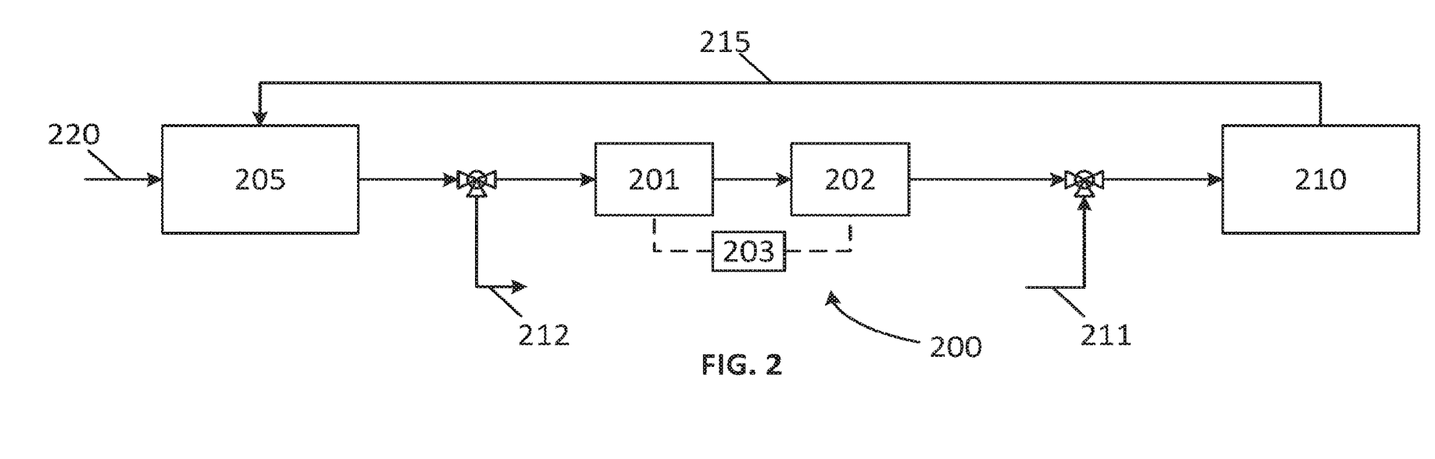
FIG. 2 illustrates a filter unit and system according to embodiments described herein.

FIG. 2 shows embodiments of a filter unit 200 and system as described herein having a water adsorbent material 201 (e.g., in any suitable form including in the form of a plurality of units, in the form of particles in a packed bed, coated substrate(s), etc.) and a gas adsorbent material 202 (e.g., in any suitable form including in the form of a plurality of units, in the form of particles in a packed bed, coated substrate(s), etc.). During operation, conditioned air flows from an HVAC system 205 and into the water adsorbent material 201 located upstream from the gas adsorbent material. Without being bound by any particular theory, it has been found that performance of the the gas adsorbent material 202 can be improved if the air entering the gas adsorbent material 202 has been at least partially dried (i.e., at least a portion of the water within the air has been removed) with the water adsorbent material 201. The air exiting the gas adsorbent material 202 is directed to cabin 210. The filter unit 200 can maintain the humidity and $CO_2$ levels of the air within the cabin 210, which is recirculated to the HVAC system 205. Fresh, outside air can be introduced to the HVAC system 205 via an air inlet line 220.

Optionally, the adsorbing materials 201, 202 of the filter unit 200 can be regenerated in situ. For example, the filter unit 200 can include an electric heater 203 connected to each adsorbent bed 201, 202. During regeneration, while the water adsorbent material 201 and the gas adsorbent material 202 are heated, regeneration air 211 is passed over the adsorbing materials 201, 202 in a direction of regeneration, that is, from the gas adsorbent material 202 and to the water adsorbent material 201 to desorb the adsorbed gas and water. The air containing the desorbed components exits through an exhaust line 212. In other embodiments, instead of directly heating the adsorbing-materials, the regeneration air 211 can be heated and passed over the adsorbing materials to desorb the gas and water. It is believed, however, that directly heating the adsorbing materials 201, 202, rather than heating the regeneration air 211, would result in less energy consumption, which could extend the life of the battery of an electric car.

In embodiments, the filter unit 200 optionally can include at least one sensor (not shown) for detecting the saturation of each adsorbent bed 201, 202 or for detecting the levels of water and $CO_2$ in the air of the passenger cabin or in the air exiting the HVAC system 205. When the sensor determines that the adsorbent bed 201, 202 is saturated, the filter unit switches to a regeneration mode.

According to further embodiments, a filter unit as described herein can be configured for continuous operation. As shown in FIG. 3, the filter unit 300 can include a pair of water adsorbent materials 301A, 301B (e.g., in any suitable form including in the form of a plurality of units, in the form of particles in a packed bed, coated substrate(s), etc.) and a pair of gas adsorbent materials 302A, 302B (e.g., in any suitable form including in the form of a plurality of units, in the form of particles in a packed bed, coated substrate(s), etc.). Those of ordinary skill in the art will recognize that two filter units, each having a single adsorption line, can function identically to one filter unit having two adsorption lines. Filter unit 300 enables the water adsorbent material 301A and the gas adsorbent material 302A to operate to remove water and gas from the air dispensed from HVAC 305, while water adsorbent material 301B and gas adsorbent material 302B are regenerated. When at least one of water adsorbent material 301A and gas adsorbent material 302A is spent, water adsorbent material 301B and gas adsorbent material 302B are then operated to remove water and gas from the air dispensed from HVAC 305. At the same time, water adsorbent material 301A and gas adsorbent material 302A are regenerated by introducing regeneration air 311A into the gas adsorbent material 302A, which flows to the water adsorbent material 301A and the air containing the desorbed gas and water flows from exhaust line 312A to exhaust the air outside of the vehicle. The adsorbing materials can be regenerated by applying heat using an electric heater 303 as shown in FIG. 3, or by heating the regeneration air as discussed above. Water adsorbent material 301B and gas adsorbent material 302B can be simlarly regenerated.

In yet further embodiments, the filter unit can include a rotary adsorption apparatus having a housing and a plurality of sectors within the housing. The plurality of sectors can form a plurality of adsorption beds. At least one of the adsorption beds can include a water adsorbent material in the form of water adsorbent particles in a packed bed. At least one of the adsorption beds can include a gas adsorbent material in the form of gas adsorbent particles in a packed bed. The water adsorbent material and the gas adsorbent material can be arranged in the rotary adsorption unit so that a flow path of gas can pass over each adsorption bed during operation and a counter-current flow path of regeneration air can pass over each adsorption bed during regeneration.

Figure 4:
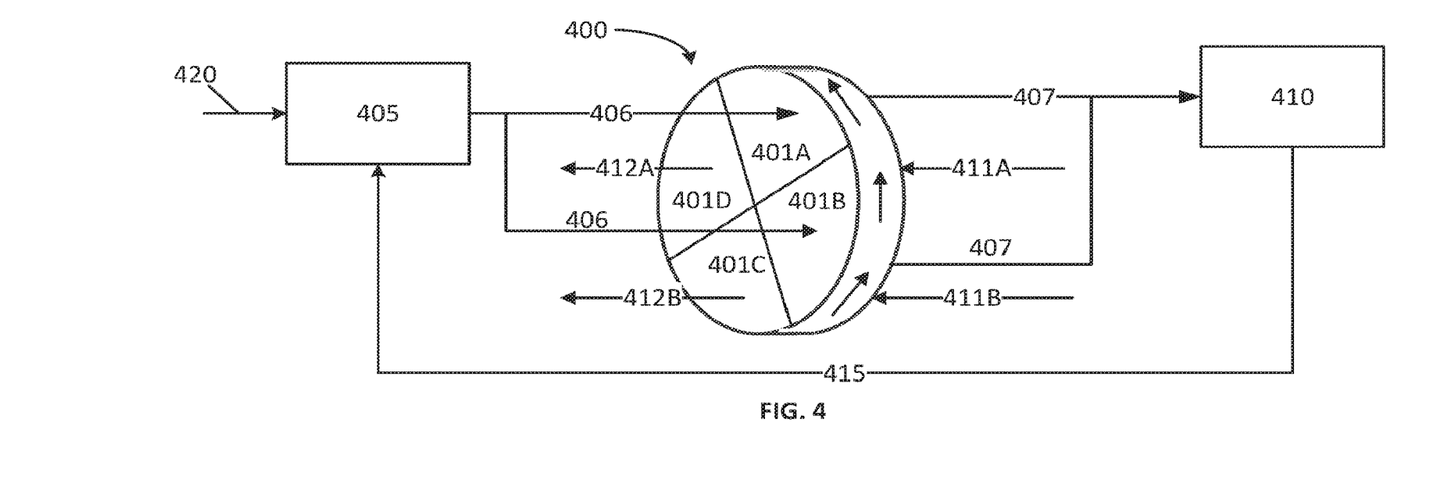
FIG. 4 illustrates a rotary wheel configuration for a filter unit and system according to embodiments described herein.

According to embodiments, the filter unit can be a rotary adsorption apparatus 400 as shown in FIG. 4. The rotary adsorption apparatus 400 can be in the form of a wheel having four sectors 401A, 401B, 401C and 401D. Two sectors 401A, 401B can be reserved for sorption and two sectors 401C, 401D can be reserved for regeneration.

Each sector 401A, 401B, 401C, 401D of the wheel 400 can be filled with a water adsorbing material and a gas adsorbing material (not shown). The water adsorbing material can be in the form of particles in a packed bed in the shape of a disk. The gas adsorbing material also can be in the form of particles in a packed bed in the shape of a disk. For example, two honeycomb supports in the shape of disks can be filled or coated with the adsorbing materials. The disk containing the gas adsorbing material can be positioned adjacent and parallel to the disk containing the water adsorbing material.

Effluent 406 from HVAC system 405 can enter a first side of sectors 401A and 401B and flow across the water adsorbing material and subsequently across the gas adsorbing material. The effluent 407 from sectors 401A and 401B can flow into a cabin 410. Similarly, regeneration gas 411A, 411B can enter the opposite side of sectors 401C and 401D, that is, the side of the wheel containing the gas adsorbing material. The regeneration gas passes over the gas adsorbing material, then the water adsorbing material and exhausts through lines 412A, 412B outside the vehicle. The regeneration gas can be heated prior to entering the rotary adsorption apparatus 400 or the adsorbing materials can be heated directly. If needed, a small cooling sector (not shown) may optionally be added for cooling the sorbent after the regeneration.

The flow arrangement through the rotary adsorption apparatus 400 can create a counter-current contacting effect within the wheel. In such a flow arrangement, while the flow configuration moves the gas from sector 401A to sector 401B, the wheel rotation can move the sorbent from sector 401B to sector 401A. A similar countercurrent contacting pattern can occur between the regeneration sectors 401C and 401D. In other embodiments, the wheel circulates with a large portion having the gas to be adsorbed and a small counter current heated zone for regeneration.

According to embodiments, the rotary adsorption apparatus can have two wheels (not shown) arranged in a symmetric configuration and mirror images of each other. Each of the two wheels has two sectors reserved for sorption and two sectors reserved for regeneration. If needed, a small cooling sector may optionally be added for cooling the sorbent after the regeneration (not shown). The two wheels can be integrated (i.e., the flow between them can be coupled), so that a countercurrent contacting pattern can be achieved.

According to further embodiments, disclosed herein are systems containing at least one filter unit as described herein. In embodiments, the filter unit can be a component of an electric automobile ventilation system. Such system can include a passenger cabin, an HVAC system for maintaining air quality in the passenger cabin, a battery and at least one filter unit as described herein. In embodiments, the filter unit maintains humidity and carbon dioxide levels within the passenger cabin and includes a water adsorbent material in the form of water adsorbent particles in a packed bed and a gas adsorbent material in the form of gas adsorbent particles in a packed bed. According to embodiments, the gas adsorbent material can be positioned downstream from the water adsorbent material in a direction of operation. The at least one filter unit is operable to increase the life of the battery of the electric automobile by about 1% to about 10%, or about 2% to about 15%, or about 5% to about 20%, or about 1% to about 20%, or about 2% to about 18%, or about 5% to about 15%, or about 8% to about 12% as compared to no filter unit. In embodiments, the at least one filter unit is also operable to decrease power consumption of the HVAC system by about 1% to about 10%, or about 2% to about 15%, or about 5% to about 20%, or about 1% to about 20%, or about 2% to about 18%, or about 5% to about 15%, or about 8% to about 12% as compared to no filter unit.

In further embodiments, disclosed herein is an automobile ventilation system that includes a passenger cabin, an HVAC system for maintaining air quality in the passenger cabin and at least one filter unit as described herein for maintaining humidity and carbon dioxide levels within the passenger cabin. The filter unit can include two adsorption lines, each adsorption line having a water adsorbent material in the form of water adsorbent particles in a packed bed and a gas adsorbent material in the form of gas adsorbent particles in a packed bed. In embodiments, the gas adsorbent material is downstream from the water adsorbent material in a direction of operation. In some embodiments, a heater is coupled to each packed bed in each adsorption line.

Water Adsorbent Materials

According to embodiments, the filter unit includes a water adsorbent material. In embodiments, the water adsorbing material can be in the form of a plurality of units. The plurality of units can include, but are not limited to, powder, beads, extrudates, tablets, pellets, agglomerates, granules and combinations thereof. In embodiments, the plurality of units have a shape that is round, spherical, spheres, ellipsoidal, regular granules, irregular granules and combinations thereof. In embodiments, the water adsorbent material can be in the form of a plurality of units (e.g., particles or beads) in a packed bed.

The size and shape of the plurality of units can have an effect on water sorption as well as pressure drop. The plurality of units can have a size of about 0.05 mm to about 10 mm, or about 0.1 mm to about 5 mm, or about 0.5 mm to about 4 mm, or about 1 mm to about 3.5 mm, or greater than 1 mm to about 3.3 mm, or about 1.6 mm to about 3.3 mm. In embodiments, the plurality of units are less than about 10 mm, less than about 5.0 mm, less than about 3.0 mm, less than about 2.5 mm, less than about 2.0 mm, less than about 1.5 mm, less than about 1.0 mm, less than about 0.5 mm, less than about 0.1 mm or less than about 0.05 mm. In yet further embodiments, the plurality of units have a mean size of about 0.05 mm to about 6.0 mm, or about 0.1 mm to about 4 mm, or about 0.5 mm to about 2 mm. In embodiments, the plurality of units having a size of greater than 1.0 mm to about 3.3 mm are particularly suitable for the water sorbent material. Furthermore, the kinetics of sorption and desorption can affect the function of the sorbent.

In embodiments, the water adsorbent material can be formed of a high porosity, high surface area material having an affinity to water and very high surface area materials. In embodiments, the water adsorbent material can include, but is not limited to, silica, alumina, a metal organic framework (MOF), titanosilicate, hydrotalcite, zelite, calcium sulfate, super absorbent polymer or combinations thereof. According to embodiments, a water adsorbent material containing silica or silica and alumina beads and having a high porosity, high surface area suitable as a water adsorbent material in the filter unit. Additionally, a MOF is a very high surface area material suitable as a water adsorbent material in the filter unit.

According to embodiments, the water sorbent can be deposited, coated or impregnated within a support. Suitable support materials for the water adsorbing material include, but are not limited to, silica, alumina, titania, clay, attapulgite, bentonite, polymer, super absorbent polymer, polymethylmethacrylate, polystyrene and combinations thereof. In embodiments, the support materials can have a pore volume of about 0.05 cc/g to about 100 cc/g, or about 0.1 cc/g to about 50 cc/g, or about 0.45 cc/g to about 25 cc/g. According to embodiments, the support materials can have a pore volume of greater than about 0.05 cc/g, or greater than about 0.1 cc/g, or greater than about 0.5 cc/g, or greater than about 0.8 cc/g. Such pore volumes enable the support to hold a significant amount of, for example, adsorbent granules without completely filling the pores.

According to embodiments, the water adsorbent material can be coated onto and/or contained within layers of a nonwoven media material; the layers can be corrugated or pleated. For example, the nonwoven media material may be a substrate as described herein. Suitable nonwoven media materials include, but are not limited to, polypropylene, polyester, nylon, cellulosic fiber and combinations thereof. The nonwoven media material can have a cross-sectional area of about 500 cm$^2$ to about 2,000 cm$^2$, or about 750 cm$^2$ to about 1,000 cm$^2$, or about 850 cm$^2$ to about 950 cm$^2$, or about 100 cm$^2$, or about 500 cm$^2$, or about 900 cm$^2$, or about 1200 cm$^2$, or about 1,600 cm$^2$, or about 100 cm$^2$ to about 10,000 cm$^2$, or about 200 cm$^2$ to about 9,000 cm$^2$, or about 300 cm$^2$ to about 8,000 cm$^2$, or about 400 cm$^2$ to about 7,000 cm$^2$, or about 500 cm$^2$ to about 6,000 cm$^2$, or about 1,000 cm² to about 5,000 cm², or about 2,000 cm² to about 4,000 cm², or any specific square area within any one of the foregoing ranges, for example, about 100 cm², or about 500 cm², or about 1,000 cm², or about 5,000 cm², or about 10,000 cm².

In further embodiments, the water adsorbent material (e.g., a plurality of substrates such as particles) can be coated the surface and/or walls of a honeycomb structure and/or contained within channels of a honeycomb structure. Suitable materials for the honeycomb structure include, but are not limited to, ceramics, cordierite, aluminum, polypropylene, cardboard, nomex, fecralloy, steel, stainless steel and combinations thereof. Examples of ceramic materials include cordierite, alumina, silicon carbide, silicon nitride, zirconia, mullite, spodumene, alumina-silica-magnesia or zirconium silicate. According to embodiments, the honeycomb structure can have channels with a diameter or width of about 0.1 in to about 1.5 in, or about 0.5 in to about 1.25 in, or about 0.25 in to about 1 inch. A screen or nonwoven material may be used to hold the water adsorbent material (e.g., a plurality of units such as particles) within the honeycomb structure. Suitable materials for the screen include, but are not limited to, ceramics, cordierite, aluminum, polypropylene, cardboard, nomex, fecralloy, steel, stainless steel and combinations thereof. In embodiments, the water adsorbent material (e.g., a plurality of units such as particles) are coated onto a substrate. For example, the water adsorbent particles can be washcoated onto a substrate. The washcoat can contain the water adsorbent material in an amount of about 0.5 g/in³ to about 10 g/in³, or about 0.75 g/in³ to about 7.5 g/in³, or about 1 g/in³ to about 6 g/in³, or greater than about 1 g/in³, or greater than about 2 g/in³, or greater than about 3 g/in³. According to embodiments, the washcoat on the substrate can have a thickness of less than about 1.0 mm, or less than about 0.75 mm, or less than about 0.5 mm, or less than about 0.25 mm, or less than about 0.2 mm, or less than about 0.15 mm, or less than about 0.1 mm. The substrate may include at least one of a honeycomb structure, foam or nonwoven media. In further embodiments, the water adsorbent particles can form an extruded honeycomb structure. The honeycomb structure can be extruded according to any suitable method known to those of ordinary skill in the art. According to embodiments, the honeycomb structure can have a cell density of about 50 cells/in² to about 600 cells/in², or about 100 cells/in² to about 500 cells/in², or about 200 cells/in² to about 450 cells/in², or about 230 cells/in² to about 400 cells/in² (a range of about 64 cpsi to about 600 cpsi).

Gas Adsorbent Materials

According to embodiments, the filter unit includes a gas adsorbent material. The gas adsorbent material can be in the form of particles (e.g., granules, powder, beads, matrix, extrudates, etc.) in a packed bed. The gas adsorbent material will be described herein in the form of a $CO_2$ adsorbent, but it is to be understood that adsorbents configured to adsorb other types of gas, for example, gases typically present in a passenger cabin such as methane, carbon monoxide or odorous gases can be used instead of or in addition to the $CO_2$ adsorbent.

In embodiments, the gas adsorbent material can include at least one of an amine, a carbamate, attapulgite, a metal organic framework (MOF), a zeolite, activated carbon, an alkali metal oxide, an alkaline earth metal oxide, a surface modified analog of any of the foregoing and combinations thereof. In embodiments, the gas adsorbent material includes an alkali metal oxide, for example, sodium hydroxide (NaOH), on a support (e.g., alumina) as described herein.

According to embodiments, the amine comprises an amine functionalized polymer, for example, a polystyrene polymer, wherein the polystyrene polymer comprises, for example, benzylamine groups. In certain embodiments, the amine-functionalized polymer (e.g., comprising polystyrene with benzylamine groups) can have a molecular weight up to about 50,000 Da, or up to about 25,000 Da, or up to about 15,000 Da, or up to about 10,000 Da, or up to about 5,000 Da, or about 1,000 Da to about 50,000 Da, or about 2,500 Da to about 10,000 Da, or about 2,500 Da to about 15,000 Da, or about 2,500 Da to about 25,000 Da, or about 2,500 Da to about 50,000 Da. In embodiments, the gas adsorbent material includes an alkaline earth oxide, for example, barium oxide (BaO), on a support (e.g., alumina) as described herein. In embodiments, the carbamate comprises one or more products of a reaction between an ethylamine and dimethyl carbonate. In embodiments, the alkali metal oxide comprises at least one of the following alkali metals: lithium, potassium, sodium, rubidium and caesium. In embodiments the alkaline earth metal oxide comprises at least one of the following alkaline earth metals: barium, strontium, calcium, beryllium, magnesium and radium.

In further embodiments, the gas (e.g., $CO_2$) adsorbent can be formed of amines impregnated in high surface area supports. An adsorbent containing an amine formed from the reaction between a higher ethylamine and dimethyl carbamate (DMC) is an example of a suitable gas adsorbent material. The adsorbent can be formed into granules together with a high pore volume silica. The amine may also be post impregnated onto pre-formed particles (e.g., granules, powder, beads, extrudates, matrix, etc.).

In certain embodiments, the gas adsorbent material may include about 10% to about 65% amine, or about 20% to about 60% amine, or about 35% to about 55% amine, or about 40% to about 50% amine, or about 35% amine, or about 40% amine, or about 45% amine, or about 50% amine, and the gas adsorbent material may include about about 20% to about 75% amine, or about 30% to about 70% amine, or about 40% to about 65% amine, or about 50% to about 60% amine, or about 45% amine, or about 50% amine, or about 55% amine, or about 60% amine. In certain embodiments, the gas adsorbent material may include about 45% amine and about 55% silica. In certain embodiments, gas adsorbent particles comprise about 35 wt % to about 55 wt % amine (e.g., particles) and about 45 wt % to about 65 wt % silica (e.g., particles), or about 40 wt % to about 50 wt % amine (e.g., particles) and about 50 wt % to about 60 wt % silica (e.g., particles), or about 45 wt % amine (e.g., particles) and about 55 wt % silica (e.g., particles).

According to certain embodiments, the gas adsorbent material can include at least one of amines and/or carbamates impregnated onto one or more high surface area supports. In embodiments, the amines can include an amine functionalized polymer, for example, a polystyrene polymer, wherein the polystyrene polymer comprises, for example, benzylamine groups. The carbamates can be one or more products of the reaction between an ethylamine and dimethyl carbonate.

The size and shape of the particles can have an effect on $CO_2$ adsorption as well as pressure drop. The particles can be in the form of granules having a size of about 0.05 mm to about 10 mm, or about 0.1 mm to about 5 mm, or about 0.5 mm to about 2 mm. In embodiments, granules having a size of about 0.5 mm to about 2 mm are particularly suitable for adsorbing $CO_2$. Furthermore, the kinetics of adsorption and desorption can affect the function of the sorbent.

According to embodiments, the gas sorbent can be deposited, coated or impregnated within a support material. Suitable support materials for the gas sorbent can include, but are not limited to, silica, alumina, titania, clay, attapulgite, bentonite, polymer, super absorbent polymer, polymethylmethacrylate, polystyrene and combinations thereof. In embodiments, support materials can have a pore volume of about 0.05 cc/g to about 100 cc/g, or about 0.1 cc/g to about 50 cc/g, or about 0.5 cc/g to about 25 cc/g. According to embodiments, the support materials can have a pore volume of greater than about 0.05 cc/g, or greater than about 0.1 cc/g, or greater than about 0.5 cc/g, or greater than about 0.8 cc/g. Such pore volumes enable the support to hold a significant amount of the adsorbent granules without completely filling the pores. The pore size is selected to provide fast diffusion into the pores even with the presence of amine. The pore diameter can be about 50 Å to about 200 Å, or about 75 Å to about 175 Å, or about 100 Å to about 150 Å. In certain embodiments, the pore diameter can be at least about 120 Å, or at least about 130 Å, or at least about 140 Å, or at least about 150 Å, or at least about 160 Å, or at least about 170 Å, or at least about 180 Å, or at least about 190 Å, or at least about 200 Å.

Various binders may be used to give strength to the adsorbent particles or coatings containing adsorbent. These binders can be organic such as styrene acrylic polymers or inorganic such as sodium silicate. The gas adsorbing material may also include fibrillated polymer fibers. For example, the gas adsorbing material can be formed using fibrillated teflon fibers to form a film which may be shaped into a monolith.

According to embodiments, the gas adsorbent particles can be contained within layers of a nonwoven media material; the layers can be corrugated. Suitable nonwoven medial materials can include, but are not limited to, polypropylene, polyester, nylon, cellulosic fiber or combinations thereof. The media material can have a cross-sectional area of about 100 cm$^2$ to about 1600 cm$^2$. In further embodiments, the gas adsorbent particles can be contained within channels of a honeycomb structure. The filter unit can include a screen or nonwoven material to hold the gas adsorbent particles within the honeycomb structure. Suitable screen materials include, but are not limited to, polypropylene, polyester, nylon, cellulosic fiber, stainless steel or combinations thereof. In further embodiments, the gas adsorbent particles can be coated onto a substrate. For example, the gas adsorbent particles can be washcoated onto a substrate. The washcoat can contain the gas adsorbent material in an amount of about 0.5 g/in$^3$ to about 10 g/in$^3$, or about 0.75 g/in$^3$ to about 7.5 g/in$^3$, or about 1 g/in$^3$ to about 6 g/in$^3$, or greater than about 1 g/in$^3$, or greater than about 2 g/in$^3$, or greater than about 3 g/in$^3$. According to embodiments, the washcoat on the substrate can have a thickness of less than about 1.0 mm, or less than about 0.75 mm, or less than about 0.5 mm, or less than about 0.25 mm, or less than about 0.2 mm, or less than about 0.15 mm, or less than about 0.1 mm.

The substrate can include at least one of a honeycomb structure, foam or nonwoven media. According to embodiments, the gas adsorbent particles form an extruded honeycomb structure. In embodiments, the honeycomb substrates can be extruded, dried and calcined and made from, for example, ceramic materials as described above. According to embodiments, the honeycomb structure can have a cell density of about 50 cells/in$^2$ to about 600 cells/in$^2$, or about 100 cells/in$^2$ to about 500 cells/in$^2$, or about 200 cells/in$^2$ to about 450 cells/in$^2$, or about 230 cells/in$^2$ to about 400 cells/in$^2$ (a range of about 64 cpsi to about 600 cpsi).

Methods of Using Filter Units

According to embodiments, disclosed herein are methods of using a filter unit as described above. In embodiments, the methods of use can include operating an adsorption line of the filter unit, the adsorption line containing a water adsorbent material in the form of water adsorbent particles in a packed bed and a gas adsorbent material in the form of gas adsorbent particles in a packed bed. In embodiments, the gas adsorbent material can be positioned downstream from the water adsorbent material in a direction of operation. During operation, the adsorbents adsorb water and gas from surrounding air, for example, conditioned air for a passenger cabin. Methods of use further include regenerating the adsorbents of the filter unit. During regeneration, the adsorption line desorbs water and gas from the water adsorbent material and the gas adsorbent material. In embodiments, each of the water adsorbent material and the gas adsorbent material can be attached to a heater and/or a sensor for detecting if the adsorbing materials are saturated. The heater can be used to regenerate the adsorbing materials or to pre-heat the regeneration air. The sensor can be used to determine if the sorbents are saturated or can monitor the humidity and $CO_2$ levels in the cabin air.

In embodiments, methods of use include operating a first adsorption line of the filter unit, the first adsorption line containing a first water adsorbent material (e.g., in any suitable form including in the form of a plurality of units, in the form of particles in a packed bed, coated substrate(s), etc.) and a first gas adsorbent material (e.g., in any suitable form including in the form of a plurality of units, in the form of particles in a packed bed, coated substrate(s), etc.). In embodiments, the first gas adsorbent material can be positioned downstream from the first water adsorbent material in a direction of operation. The first water adsorbent material and the first gas adsorbent material adsorb water and gas from air exhausted from an HVAC system. Methods of use further include regenerating a second adsorption line of the filter unit, the second adsorption line containing a second water adsorbent material in the form of water adsorbent particles in a packed bed and a second gas adsorbent material in the form of gas adsorbent particles in a packed bed. In embodiments, the second gas adsorbent material can be positioned upstream from the second water adsorbent material in a direction of regeneration. During regeneration, the second adsorption line desorbs water and gas from the second water adsorbent material and the second gas adsorbent material. According to embodiments, each packed bed in each of the first adsorption line and second adsorption line is connected to a heater, which heats the sorbents to initiate desorption. In embodiments, regeneration can include passing external air (i.e., regeneration air) over the second gas adsorbent material and the second water adsorbent material and exhausting the external air comprising desorbed gas and desorbed water into an external atmosphere. Alternatively, the regeneration air can be pre-heated prior to passing over the sorbents.

According to embodiments, operating the first adsorption line and regenerating the second adsorption line can occur at the same time; once the second adsorption line is finished regenerating, it can remain idle until the first adsorption line requires regenerating. In embodiments, when the first adsorption line completes operation and begins regenerating, the second adsorption line begins operating; the process is then reversed when at least one of the sorbents in the second adsorption line becomes saturated.

According to embodiments, methods of using filter units as described herein include regenerating the adsorbent materials at a temperature of about 50° C. to about 200° C., or about 60° C. to about 190° C., or about 70° C. to about 180° C., or about 80° C. to about 170° C., or about 90° C. to about 160° C., or about 100° C. to about 150° C., or about 50° C., or about 55° C., or about 60° C., or about 65° C., or about 70° C., or about 75° C., or about 100° C., or about 150° C., or about 200° C. Regenerating can further include exhausting desorbed water and gas into an external atmosphere.

Filter units and systems as described herein are particularly useful for maintaining the humidity and $CO_2$ levels of the air in an enclosed space, such as in a passenger cabin. According to embodiments, a filter unit having a single adsorption line (i.e., one water adsorbent material and one gas adsorbent material) can be operated in connection with an HVAC system to remove water and $CO_2$ from the HVAC-conditioned air prior to entering the passenger cabin as shown in FIG. 2 (discussed above). In embodiments, if such a filter unit is used to condition the air in the passenger cabin of a vehicle (e.g., an electric vehicle), the filter unit can operate until saturated at which time it will switch to a regeneration mode to desorb and exhaust water and $CO_2$ to an external atmosphere. While the filter unit is regenerating, the vehicle can operate as if no filter unit is installed, that is, it will cleanse the cabin air by introducing fresh, outside air into the HVAC system.

In further embodiments, at least one filter unit as described herein can be operated to reduce the $CO_2$ levels in a cabin of a vehicle (e.g., an electric vehicle) well below (e.g., about 20% below) $CO_2$ toxicity levels (i.e., well below the recommended $CO_2$ concentration limit of 1000 ppm indoors). Similarly, the filter unit can be operated to reduce the humidity levels to well below (e.g., about 20% below) a standard relative humidity of about 50% r.h. Sensors can be employed to detect the humidity and $CO_2$ levels in the air of the passenger cabin. Upon achieving this lower limit, operation of the filter unit and intake of fresh air by the HVAC system may stop to conserve energy. If the filter unit is saturated at this time (e.g., as measured by a sensor), the filter unit can be regenerated. When either or both humidity and $CO_2$ levels reach a specified target (e.g., 900 ppm $CO_2$ and/or 55% r.h.), the filter unit can be once again operated to remove humidity and $CO_2$ from the air.

In yet further embodiments, at least one filter unit as described herein can be sized to enable a pre-determined time of operation (i.e., length of time before regeneration is required), for example, at least 1 hour, at least 2 hours, at least 3 hours, at least 4 hours, at least 5 hours, at least 6 hours, at least 7 hours, at least 8 hours, at least 12 hours, at least 20 hours or at least 24 hours. For example, the filter unit can be operated to maintain the water and $CO_2$ levels in a cabin of a vehicle (e.g., an electric vehicle) at acceptable levels (e.g., at 300 ppm $CO_2$ and 50% r.h.) while the vehicle is operating. When the ignition key is removed or, in the case of an electric vehicle, when the battery is plugged in, the filter unit can be regenerated. If the filter unit becomes saturated before the vehicle is turned off or plugged in, then it can be regenerated and the vehicle can function as if no filter unit is installed (i.e., by drawing in fresh, outside air) or, if a second filter unit is installed, then the second filter unit can begin operation while the first unit is being regenerated.

EXAMPLES

Example 1

Gas Adsorbing Material

Granules were formed by combining 45% by weight amine with 55% by weight silica to a size of approximately 1 mm in diameter. The amine was formed by the reaction of pentaethylenehexamine and dimethyl carbonate in a 1:1 molar ratio. This material has a capacity of 5.6% by weight of $CO_2$ per weight of adsorbent when exposed to 1000 ppm $CO_2$ in air at 30° C. after prior regeneration at 70° C. with 1000 ppm in air.

Example 2

Gas Adsorbing Material

Spherical beads were formed having a diameter of approximately 0.5 mm (90% of material was in the range of 0.3 mm to 1.25 mm). The beads were composed of a polystyrene polymer functionalized with benzylamine groups having about 0.01 mol (e.g., a range of 0.008 mol to 0.012 mol) of amine groups per gram of material (dry basis). The material having a capacity of 3.0% by weight of $CO_2$ per weight of adsorbent when exposed 1000 ppm $CO_2$ in air at 30 C after prior regeneration at 70 C with 1000 ppm in air.

Example 3

Water Adsorbing Material

Spherical beads of $SiO_2/Al_2O_3$ (97:3) were prepared and had a diameter of approximately 2 mm, a surface area approximately 650 $m^2/g$ and a pore volume of approximately 0.45 cc/g. The material has an equilibrium capacity for water vapor of 4% by weight of $H_2O$ per weight of sorbent at 10% relative humidity at 25° C. and 42% by weight at 80% relative humidity at 25° C.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail in order to avoid unnecessarily obscuring the present invention. Thus, the specific details set forth are exemplary. Particular embodiments may vary from these exemplary details and still be contemplated to be within the scope of the present invention.

Although the operations of the methods herein are described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A filter unit adapted to maintain humidity and carbon dioxide levels in a passenger cabin of an automobile, a van, a bus, a train or a truck, the filter unit comprising:
   two adsorption lines, each adsorption line comprising:
      a water adsorbent material arranged to contact an inflow of air conditioned by a heating, ventilation, and air conditioning (HVAC) system; and a gas adsorbent material arranged to contact the air prior to exiting into the passenger cabin, the gas adsorbent material comprising a carbamate that is the product of a reaction between an ethylamine and dimethyl carbonate, wherein the gas adsorbent material is downstream from the water adsorbent material in a direction of operation; and a heater coupled to the water adsorbent material and the gas adsorbent material in each adsorption line.

2. The filter unit of claim 1, wherein at least one of the water adsorbent material and the gas adsorbent material is in the form of a plurality of units.

3. The filter unit of claim 2, wherein the plurality of units comprise at least one of powder, beads, extrudates, tablets, pellets, agglomerates and granules.

4. The filter unit of claim 1, wherein at least one of the water adsorbent material and the gas adsorbent material is at least one of coated onto a nonwoven media material and contained within layers of the nonwoven media material.

5. The filter unit of claim 4, wherein the layers of nonwoven material are at least one of corrugated and pleated.

6. The filter unit of claim 4, wherein the nonwoven media material has a cross-sectional area of about 100 $cm^2$ to about 10,000 $cm^2$.

7. The filter unit of claim 1, wherein at least one of the water adsorbent material and the gas adsorbent material is at least one of coated onto a honeycomb substrate and contained within channels of the honeycomb substrate.

8. The filter unit of claim 1, wherein at least one of the water adsorbent material and the gas adsorbent material is coated onto a substrate.

9. The filter unit of claim 8, wherein the substrate comprises at least one of a honeycomb structure, a foam and a nonwoven media.

10. The filter unit of claim 1, wherein at least one of the water adsorbent material and the gas adsorbent material is an extruded honeycomb structure or is coated onto an extruded honeycomb structure.

11. The filter unit of claim 1, wherein the gas adsorbent material is impregnated onto one or more high surface area supports.

12. The filter unit of claim 11, wherein the high surface area supports comprise a pore volume of greater than about 0.8 cc/g.

13. The filter unit of claim 11, wherein the high surface area supports have a mean pore diameter of greater than about 100 Å.

14. The filter unit of claim 1, wherein the gas adsorbent material comprises about 35 wt % to about 55 wt % amine and about 45 wt % to about 65 wt % silica.

15. The filter unit of claim 1, wherein the water adsorbent material is present in an amount of about 0.1 L per passenger to about 15.0 L per passenger, and wherein the gas adsorbent material is present in an amount of about 0.5 L per passenger to about 20.0 L per passenger.

16. A system, comprising:
a passenger cabin;
a heating, ventilation and air conditioning (HVAC) system for maintaining air quality in the passenger cabin; and
a filter unit according to claim 1 for maintaining humidity and carbon dioxide levels within the passenger cabin.

17. An electric automobile ventilation system, comprising:
a passenger cabin;
a heating, ventilation and air conditioning (HVAC) system for maintaining air quality in the passenger cabin;
a battery; and
a filter unit according to claim 1 for maintaining humidity and carbon dioxide levels within the passenger cabin.

18. A filter unit adapted to maintain humidity and carbon dioxide levels in a passenger cabin of an automobile, a van, a bus, a train or a truck, the filter unit comprising:
a rotary adsorption apparatus comprising:
a housing;
a plurality of sectors within the housing, wherein the plurality of sectors form a plurality of adsorption beds; and
a water adsorbent material in at least one of the adsorption beds arranged to contact an inflow of air conditioned by a heating, ventilation, and air conditioning (HVAC) system; and
a gas adsorbent material in at least one of the adsorption beds arranged to contact the air prior to exiting into the passenger cabin, the gas adsorbent material comprising a carbamate that is the product of a reaction between an ethylamine and dimethyl carbonate, wherein the water adsorbent material and the gas adsorbent material are arranged in the rotary adsorption apparatus so that a flow path of gas can pass over each adsorption bed during operation and a counter-current flow path of regeneration air can pass over each adsorption bed during regeneration.

* * * * *